US007689213B2

(12) United States Patent
Olgaard et al.

(10) Patent No.: US 7,689,213 B2
(45) Date of Patent: Mar. 30, 2010

(54) METHOD FOR TESTING EMBEDDED WIRELESS TRANSCEIVER WITH MINIMAL INTERACTION BETWEEN WIRELESS TRANSCEIVER AND HOST PROCESSOR DURING TESTING

(75) Inventors: Christian Volf Olgaard, Sunnyvale, CA (US); Benny Madsen, Los Altos, CA (US)

(73) Assignee: LitePoint Corp., Sunnyvale, CA (US)

( * ) Notice: Subject to any disclaimer, the term of this patent is extended or adjusted under 35 U.S.C. 154(b) by 383 days.

(21) Appl. No.: 11/279,778

(22) Filed: Apr. 14, 2006

(65) Prior Publication Data
US 2007/0243825 A1 Oct. 18, 2007

(51) Int. Cl.
*H04W 24/00* (2009.01)
(52) U.S. Cl. .................. 455/425; 455/557; 455/423
(58) Field of Classification Search .............. 455/418, 455/419, 420, 423, 424, 425, 67.11, 67.12, 455/67.14, 67.16, 67.17, 557
See application file for complete search history.

(56) References Cited

U.S. PATENT DOCUMENTS

| | | | | | |
|---|---|---|---|---|---|
| 6,104,304 | A | * | 8/2000 | Clark et al. ............... | 340/664 |
| 6,914,944 | B1 | | 7/2005 | Nokkonen et al. | |
| 2004/0203443 | A1 | * | 10/2004 | Woolf et al. ............. | 455/67.11 |
| 2004/0203467 | A1 | * | 10/2004 | Liu et al. ................ | 455/67.14 |
| 2005/0032511 | A1 | * | 2/2005 | Malone et al. ............ | 455/420 |
| 2005/0176376 | A1 | * | 8/2005 | Liu ........................ | 455/67.16 |
| 2005/0260962 | A1 | * | 11/2005 | Nazrul et al. ............ | 455/226.1 |
| 2006/0239337 | A1 | * | 10/2006 | Green et al. .............. | 375/219 |
| 2007/0091814 | A1 | * | 4/2007 | Leung et al. .............. | 370/252 |
| 2007/0093243 | A1 | * | 4/2007 | Kapadekar et al. ........ | 455/419 |
| 2007/0105587 | A1 | * | 5/2007 | Lu ........................ | 455/552.1 |

OTHER PUBLICATIONS

U.S. Appl. No. 11/161,692, filed Aug. 12, 2005, entitled "Method for Measuring Multiple Parameters of a Signal Transmitted by a Signal Generator".
U.S. Appl. No. 11/839,828, filed Aug. 16, 2007, entitled "System for Testing an Embedded Wireless Transceiver".
U.S. Appl. No. 11/422,475, filed Jun. 6, 2006, entitled "Method for Capturing Multiple Data Packets in a Data Signal for Analysis".
U.S. Appl. No. 11/422,489, filed Jun. 6, 2006, entitled "Apparatus for Capturing Multiple Data Packets in a Data Signal for Analysis".
U.S. Appl. No. 11/839,814, filed Aug. 16, 2007, entitled "System for Testing an Embedded Wireless Transceiver".
U.S. Appl. No. 11/839,788, filed Aug. 16, 2007, entitled "Apparatus, System and Method for Calibrating and Verifying a Wireless Communication Device".
International Search Report for International Application No. PCT/US07/66211 dated Nov. 24, 2008, 2 pp.
Written Opinion for International Application No. PCT/US07/66211 dated Nov. 24, 2008, 5 pp.

* cited by examiner

*Primary Examiner*—Edward Urban
*Assistant Examiner*—Christian A Hannon
(74) *Attorney, Agent, or Firm*—Vedder Price P.C.

(57) ABSTRACT

A method for testing a wireless transceiver embedded within a wireless data communication system that also includes a host processor with minimal interaction between the wireless transceiver and the host processor during such testing. The wireless signal interface between the wireless data communication system and external test equipment is used to convey test initiation or data signals from the external test equipment to the wireless data communication system, and responsive data or acknowledgement signals from the wireless data communication system to the external test equipment.

18 Claims, 4 Drawing Sheets

METHOD FOR TESTING EMBEDDED WIRELESS TRANSCEIVER WITH MINIMAL INTERACTION BETWEEN WIRELESS TRANSCEIVER AND HOST PROCESSOR DURING TESTING

BACKGROUND OF THE INVENTION

1. Field of the Invention

The present invention relates to wireless data communication systems having a host processor and wireless transceiver embedded therein, and in particular, to production testing of such systems.

2. Related Art

As the number and uses of wireless data communication systems increase, it has become increasingly important to the manufacturers of such systems to perform production testing of the wireless transceivers embedded in such systems in a more time-efficient manner. As is well known, a problem with production testing of such embedded transceivers is that no direct, e.g., wired, digital control connection is generally available between the device under test (DUT) and the test controller (e.g., personal computer). Instead, communication must take place through the host processor also embedded within the system. Accordingly, production testing becomes more complicated in that the testing firmware must be installed or stored for running on the embedded host processor.

While using firmware in an embedded processor may be acceptable for a single platform, this approach quickly becomes unacceptable when multiple platforms are involved and must be supported. Further, as is often the case, the wireless transceiver function, e.g., a wireless data transceiver operating according to the IEEE 802.11 standard, is merely a small portion of the overall set of functions of the host system. Accordingly, the manufacturer, while interested in producing a fully functional wireless transceiver capability, is nonetheless not interested in spending significant resources on integrating the wireless function in view of its limited role in the overall operation of the system. Therefore, it would be desirable to provide for a simpler and more streamlined method of production testing for such systems, with only minimal changes required when performing production testing of various systems.

SUMMARY OF THE INVENTION

In accordance with the presently claimed invention, a method is provided for testing a wireless transceiver embedded within a wireless data communication system that also includes a host processor with minimal interaction between the wireless transceiver and the host processor during such testing. The wireless signal interface between the wireless data communication system and external test equipment is used to convey test initiation or data signals from the external test equipment to the wireless data communication system, and responsive data or acknowledgement signals from the wireless data communication system to the external test equipment.

In accordance with one embodiment of the presently claimed invention, a method for testing data signal transmissions of a wireless transceiver embedded within a wireless data communication system that also includes a host processor with minimal interaction between the wireless transceiver and the host processor during the testing includes:

transferring test firmware via the host controller to the wireless transceiver;

setting the wireless transceiver in a test operation mode;

transmitting, with the wireless transceiver, one or more test data signals in response to reception, by the wireless transceiver, of one or more predetermined test initiation signals from a control signal source external to the wireless data communication system; and measuring, with a test system external to the wireless data communication system, one or more parameters of each one of the one or more transmitted test data signals.

In accordance with another embodiment of the presently claimed invention, a method for testing data signal reception of a wireless transceiver embedded within a wireless data communication system that also includes a host processor with minimal interaction between the wireless transceiver and the host processor during the testing includes:

transferring test firmware via the host controller to the wireless transceiver;

setting the wireless transceiver in a test operation mode;

receiving, with the wireless transceiver, one or more test data signals from a data signal source external to the wireless data communication system; and transmitting, with the wireless transceiver, at least one acknowledgement signal in response to reception of each one the one or more test data signals that is recognized by the wireless transceiver as one of a plurality of predetermined data signal types.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
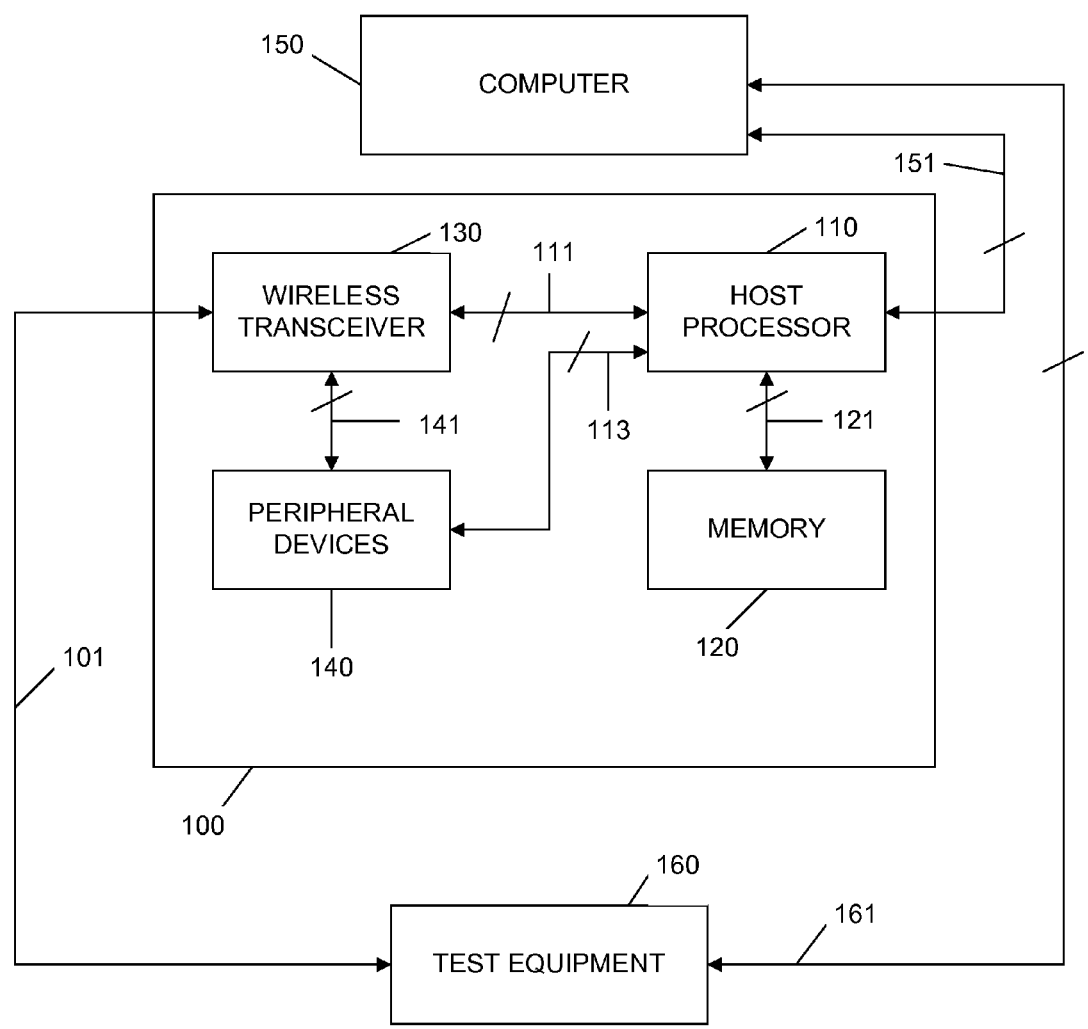
FIG. 1 is a functional block diagram of a wireless data communication system in a production test environment.

Referring to FIG. 1, a wireless data communication system in a general production test environment includes the DUT 100, a computer 150 for control of the testing, and test equipment 160 (e.g., including a vector signal generator (VSG) and a vector signal analyzer (VSA)), all interconnected substantially as shown. The DUT 100 has a number of embedded sub-systems, including a host processor 110, memory 120 (e.g., non-volatile memory), a wireless transceiver 130 and one or more peripheral devices 140, interconnected substantially as shown. The host processor 110 controls the memory 120, wireless transceiver 130 and peripheral devices 140 via various control interfaces 121, 111, 113. Typically, the memory 120 stores, as firmware, programs to be used by the DUT 100. The control computer 150 generally runs the production test software that controls the DUT 100 through an external interface 151, e.g., universal serial bus (USB), serial peripheral interface (SPI), RS-232 serial interface, etc. The control computer 150 also controls the test equipment 160 via another interface 161, e.g., USB, general purpose interface bus (GPIB), Ethernet, etc. The test equipment 160 communicates with the wireless transceiver 130 via an interface 101, which can be a wireless interface, but for production testing purposes is usually a wired interface.

In a typical transmitter test scenario, the control computer 150 will send one or more commands to the host processor 110, which translates such commands into corresponding commands for the wireless transceiver 130. Following transmission of the test signal via the test interface 101, the control computer 150 retrieves the measurement results form the test equipment 160 (via its interface 161), following an appropriate delay for the wireless transceiver 130 to settle at its programmed output frequency and power.

As can be seen by this example, the commands necessary for the wireless transceiver 130 must pass through and be translated by the host processor 110. As the host processor 110 can be of many different types, and run many different operating systems, it will generally be very difficult to provide the necessary software inside the host processor 110 for translating the commands appropriately. Normally, such software must be written specifically for each application, thereby making it a difficult process for a system integrator to integrate the wireless transceiver 130 within the system 100.

As discussed in more detail below, a proposed test method in accordance with the presently claimed invention provides for simplified production testing using a predetermined test flow, or sequence, to verify the performance of the embedded wireless transceiver. By pre-programming the wireless transceiver with the test flow, minimal, if any, communication between the wireless transceiver and the host processor 110 will be needed during testing. The test flow can be uploaded to the transceiver 130 as part of the loading of the testing firmware, or can alternatively be made an integral part of the firmware, e.g., with a pre-determined data area defining the tests. After completion of the loading of the firmware into the transceiver 130, the device will be placed into a test mode where it awaits commands from the test equipment 160. This can be done as part of the firmware that is loaded, or as a separate command issued by the host processor 110. As a result, the only interaction with the host processor 110 involves the loading of the firmware, loading of the test flow (unless it is an integrated portion of the firmware), and possibly a command to place the wireless transceiver 130 in a production test mode of operation.

Figure 2:
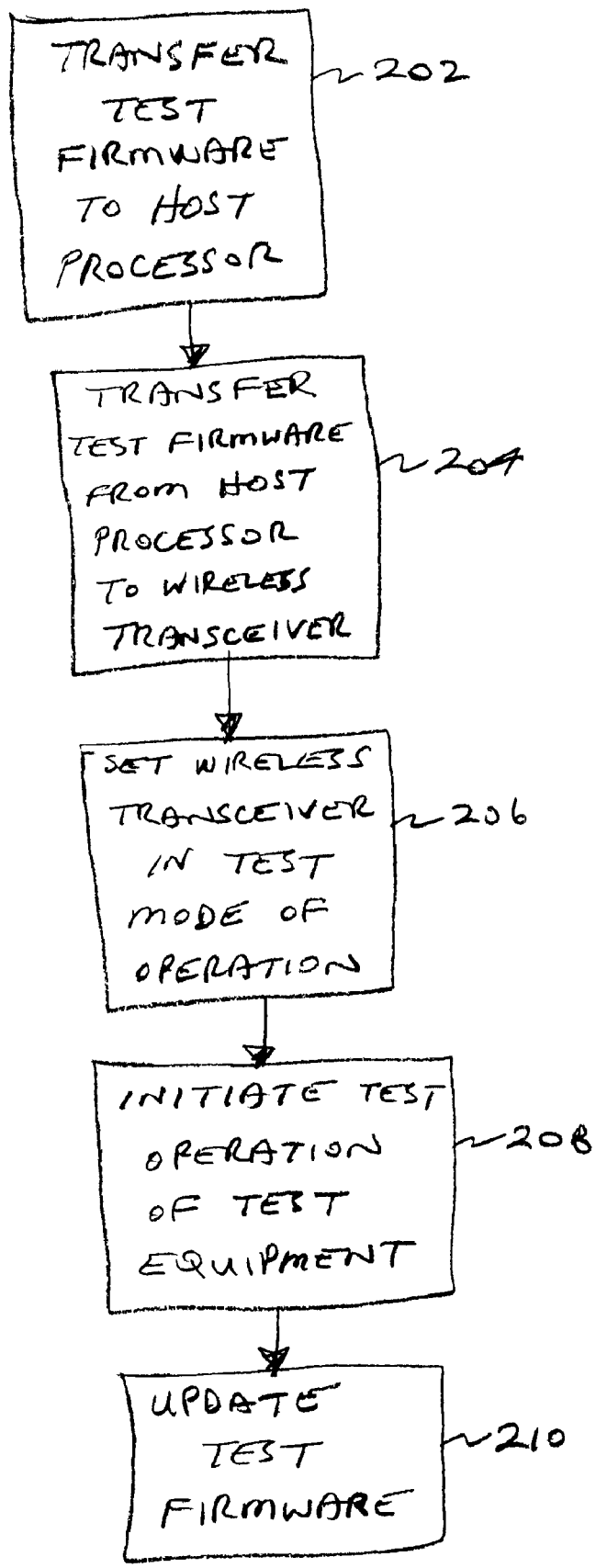
FIG. 2 depicts a method for testing the wireless data communication system of FIG. 1 in accordance with one embodiment of the presently claimed invention.

Referring to FIG. 2, one example of this method can be depicted as shown. In the first step 202, the test firmware is transferred to the host processor 110, generally by the control computer 150. In the next step 204, the test firmware is transferred from the host processor 110 to the wireless transceiver 130 via the interface 111. It should be understood that the test firmware may be complete in that it also includes the desired test flow, or sequence, as an integral part. Alternatively, the test flow data can be transferred to the host processor 110 from the computer 150, and then relayed to the wireless transceiver 130. As a further alternative, the desired test flow data can be in the form of a data table previously stored in the memory 120, that can now be retrieved via the interface 121 and relayed by the host processor 110 to the wireless transceiver 130.

In the next step 206, the wireless transceiver 130 is set in a test mode of operation, i.e., where the wireless transceiver 130 will now await one or more commands from the test equipment 160 (discussed in more detail below), e.g., by listening for a command from the test equipment 160 on a predetermined frequency. Such setting of the wireless transceiver 130 in its test mode operation can be initiated automatically as part of the test firmware that has been loaded, or can be initiated by an appropriate command issued by the host processor 110. In the next step 208, test operation of the test equipment 160 is initiated, e.g., by sending the appropriate command for which the wireless transceiver 130 is listening, as noted. Alternatively, the wireless transceiver 130 can transmit a "ready" signal at a predetermined frequency, following the reception of which the test equipment 160 will begin sending one or more test commands. Preferably, the command set is minimal, e.g., only a NEXT type of command, thereby requiring only that the receiver watch for a good data packet (e.g., representing a NEXT command), and further thereby not requiring any media access control (MAC) layer operations. Following transmission of the initial test command from the test equipment 160, the wireless transceiver 130 preferably transmits an acknowledgement signal to indicate reception of such command, following which the main sequence of test commands form the test equipment 160 will begin. Controlling of the test equipment 160 is done under supervision by the control computer 150 via the interface 161.

A subsequent step 210 can include updating of the test firmware loaded into the wireless transceiver 130, whereby various operation settings, parameters or conditions can be modified based on data (e.g., transceiver calibration data) received from the control computer 150 via the host processor 110 or from a data table stored in the memory 120 conveyed via the host processor 110 to the wireless transceiver 130.

Figure 3:
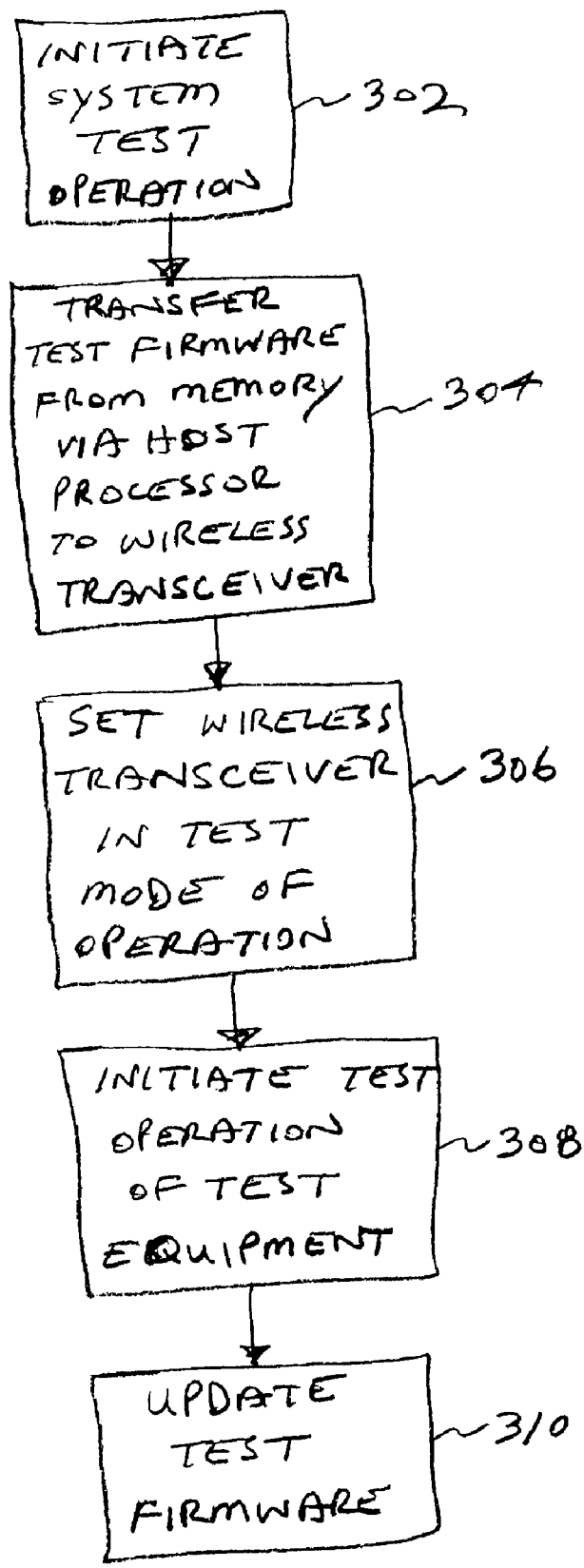
FIG. 3 depicts a method for testing the wireless data communication system of FIG. 1 in accordance with another embodiment of the presently claimed invention.

Referring to FIG. 3, a test method in accordance with another embodiment of the presently claimed invention has a first step 302 of initiating system test operation. This causes the host processor 110 to be prepared for the next step 304 in which the test firmware is transferred form the memory 120 via the host processor 110 to the wireless transceiver 130. As discussed above, the test firmware can include the test flow, or can also be composed of two components, i.e., the test commands and test sequence data. In the next step 306, the wireless transceiver is set in its test mode of operation. As discussed above, this can be done automatically as part of the loading of the test firmware, or can be initiated by an appropriate command sent by the host processor 110 via the interface 111, with such command either initiated by the host processor 110 or conveyed by the host processor 110 in response to its reception from the computer 150.

In the next step 308, actual testing is initiated. As discussed above, this can be in the form of either the wireless transceiver 130 initiating communication with the test equipment 160 over the interface 101, or the test equipment 160, under the control of the computer 150, initiating communication with the wireless transceiver 130 via the interface 101.

Subsequent steps can include a step 310 in which the test firmware is updated, as discussed above, to modify various test settings, parameters or conditions.

As discussed above, a test method in accordance with the presently claimed invention includes steps for placing the DUT 100 in a test operation mode in conjunction with the external test equipment 160. Following that, there are two general categories of testing: testing of the signal transmit function of the wireless transceiver 130; and testing of the signal reception function of the wireless transceiver 130.

Figure 4:
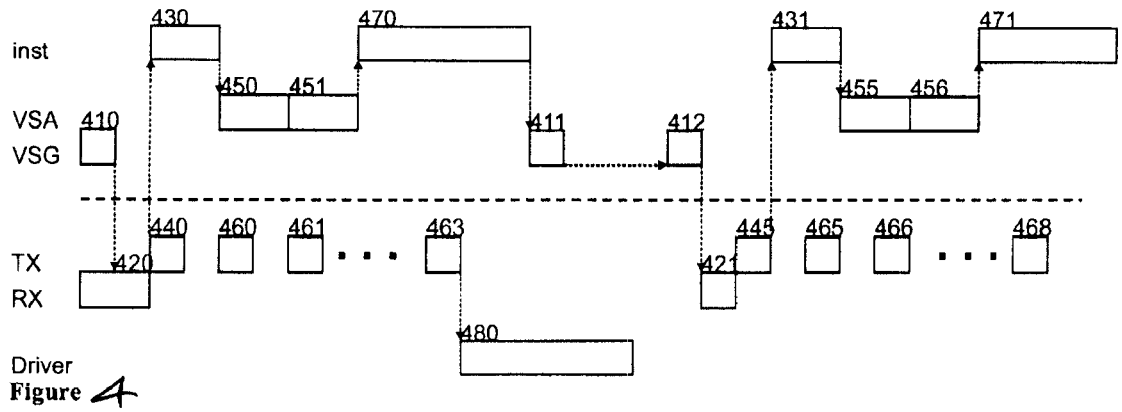
FIG. 4 depicts a test sequence for performing signal transmission testing of the wireless data communication system of FIG. 1 in accordance with one embodiment of the presently claimed invention.

Referring to FIG. 4, one example of a transmit test sequence can be described as follows. Testing begins with the receiver (RX) portion of the DUT 100 awaiting a command 420. The test equipment 160 issues its command 410 (e.g., a GOTO-NEXT command). Following reception of this command, the transmitter (TX) of the DUT 100 transmits an acknowledgment signal 440 indicating it received and understood the command. Following this, the DUT 100 begins transmitting data signals as determined by the test flow. This is represented by signal transmission time slots 460, 461, . . . 463. The test flow will determine the number of packets to be transmitted, with such transmitted packets containing the same signal, or multiple signals in the case of a multi-packet transmission.

Following receipt of the acknowledgement 440, the test equipment 160 will wait for a specified time integral 430 to allow the transmitter to settle to its desired operation (e.g., frequency accuracy and power level). Following this time interval 430, the test equipment 160 begins performing measurements 450, 451. Following completion of these measurements 450, 451, the test equipment 160, or alternatively the controller computer 150, after having accessed the data collected by the test equipment 160, analyzes the collected data and prepares to set up the next test sequence 470. Similarly, following completion of its signal transmissions 463, the DUT 100 will prepare for the next portion of the test sequence by processing any necessary operations 480.

When the test equipment 160 or computer 150 has completed processing of the data 470, the next test command (e.g., GOTO-NEXT) is transmitted. The first of such commands 411 may not be received by the DUT 100 if its preparations 480 for the next test have not yet been completed. If so, no acknowledgement signal is received by the test equipment 160. Accordingly, the test equipment 160 will continue to send its commands 412, following which at some point in time one of these commands 412 will be received 421 by the DUT 100 and an acknowledgement 445 will be transmitted by the DUT 100. This will be the start of a new test sequence where the DUT 100 will transmit a new test signal a known number of times 465, 466, . . . 468, and the test equipment 160 will perform the desired measurements 455, 456, followed by further analysis and preparation for subsequent testing 471.

It should be understood that, although unusual in a production test environment, the test equipment 160 may not receive good data from the DUT 100. While this is generally an indication of a bad DUT 100, it may be desirable to repeat the failed test before simply discarding the DUT 100. In such a situation, two possible courses of action exist. According to one, the test equipment 160 can send a different command (e.g., a REPEAT command rather than a GOTO-NEXT command). This is a simple implementation and should be easy for the DUT 100 to identify this different command. However, this can slow testing down as the test equipment 160 may need to load a new command or new data to enable the generation of a new signal. Alternatively, the test equipment 160 can simply not send another command, following which the DUT 100 can interpret this as an indication that the measurement was not successful, in which case the DUT 100 simply repeats the original test.

As noted above, the transmit signals 460, 461, . . . 463, being sent by the DUT 100 can be a single transmit signal, or can be a set of multi-packet signals. Using such multi-packet signals has an advantage that little or no communication is needed between the test equipment 160 and the DUT 100 during calibration, since a solution is generally reached by iteration, as discussed in U.S. patent application Ser. No. 11/161,692, filed Aug. 12, 2005, and entitled "Method for Measuring Multiple Parameters of a Signal Transmitted by a Signal Generator," the disclosure of which is incorporated herein by reference.

Figure 5:
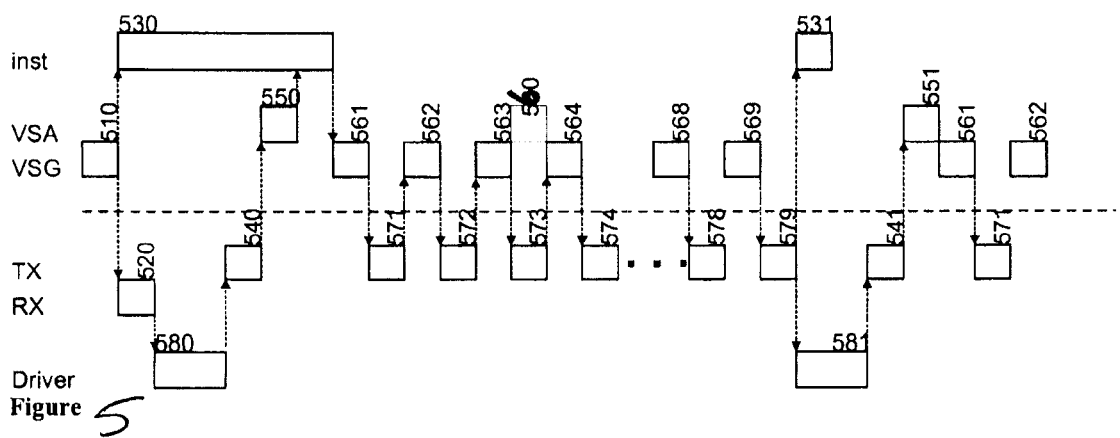
FIG. 5 depicts a test sequence for performing signal reception testing of the wireless data communication system of FIG. 1 in accordance with another embodiment of the presently claimed invention.

Referring to FIG. 5, the expected test flow for receiving signals can be described as follows. This test flow differs from the signal transmission test flow in that it is intended to implement the test such that the DUT 100 need not fully analyze (if at all) the data actually being received from the test equipment 160, but rather simply determine if a valid packet has been received. Accordingly, the test equipment need not issue a test command (e.g., a GOTO-NEXT command) when transitioning from one received test to another. Instead, it is preferable to let the DUT 100 determine when to move on to the next test. This can be done by simply having the DUT 100 continue to the next test when the DUT has received a predetermined number of good signal packets.

If the DUT 100 transmits an acknowledgement whenever it has received a good packet, the test equipment 160 can simply count the number of good packets without requesting such count from the DUT 100, thereby allowing the received signal test flow to progress without additional communications being necessary to simply determine the results of the test, since the test equipment 160 knows how many packets were sent and can determine how many were received by simply counting the number of acknowledgement signals received form the DUT 100. This technique is particularly valid where the test equipment 160 includes test equipment like the VSA and VSG because it is unlikely to have lost acknowledgement signals since the transmitter power of the DUT 100 is generally higher than the transmitter power of the VSG. Hence, it is unlikely that the VSA will miss an acknowledgement signal packet, particularly if the VSA is triggered by the trailing edge of the signal packet transmitted by the VSG. Further, having the VSA receive the acknowledgement packet provides the additional benefit of allowing the switching time of the transmit/receive switch in the DUT 100 to be tested as well.

Referring again to FIG. 5, the test equipment 160 transmits the test command 510. Assuming the previous test was a transmit test, this test command 510 instructs the DUT 100 to initiate the next test which is a receive test. The DUT 100 receives this command 520, which causes the test firmware to enable the receive test 580. When the receiver section of the DUT 100 is ready, an acknowledgement signal is transmitted 540, indicating the readiness of the receiver. This can be important as compared to conventional test methods where packets are sent by the test equipment 160 until the receiver starts receiving such packets. By having the DUT 100 indicate its readiness, the test equipment 160 need only enable its VSA to await reception of the acknowledgment signal from the DUT 100, following which the test equipment 160 can then prepare for receive testing 530.

When the test equipment 160 (e.g., the VSA) receives the acknowledgement signal 540, the test equipment 160 knows that the DUT 100 is ready and begins signal transmission. Accordingly, the test equipment 160 (e.g., the VSG) begins transmitting a predetermined number of signal packets 561, 562, 563, 564, 568, 569, each of which produces a corresponding acknowledgement signal 571, 572, 573, 574, 578, 579. The test equipment 160 receives these acknowledgement packets and increases its internal count for each such packet received. Additionally, as noted above, the transmit/receive switch operation of the DUT 100 can be analyzed by analyzing an interval 560 between a transmitted test signal 563 and the reception of an acknowledgement signal 573. (Using an acknowledgement signal in this manner is advantageous since such a signal is already included in virtually all standard or default transceiver signal sets, thereby avoiding a need for adding another otherwise unnecessary signal or functionality).

In this example, no packet errors have occurred, so the DUT 100 has received the predetermined number of packets and will move on to the next receive test 581. Similarly, the test equipment 160 knows that the DUT 100 has received all packets based upon the received number of acknowledgement signals and can prepare for the next receive test 531 as well. When the DUT 100 is prepared, an acknowledgement signal is transmitted 541 indicating such readiness, and the test equipment 160, following reception of this acknowledgement 551, begins to transmit packets for the next test 561. In the event that the DUT 100 has not received packets within a predetermined time interval, it can retransmit its acknowledgement 541, e.g., where the DUT 100 becomes ready faster than the test equipment 160 for the next test.

Figure 6:
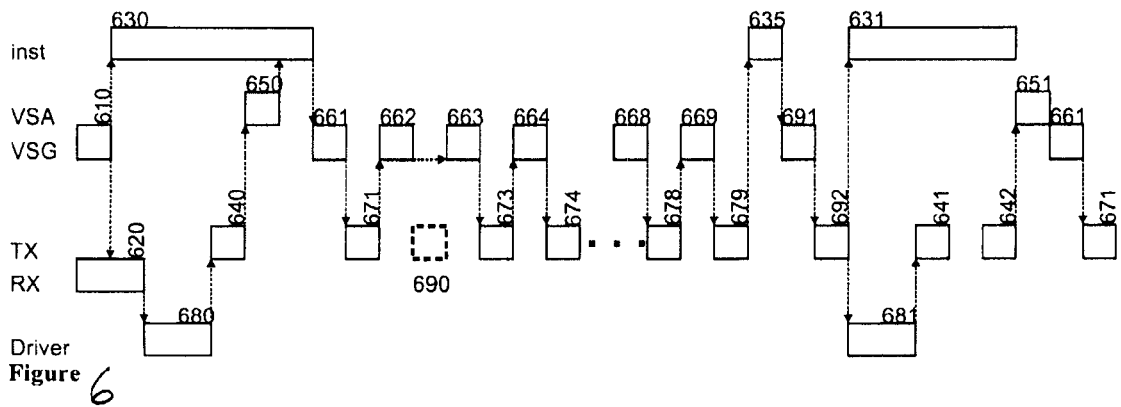
FIG. 6 depicts a test sequence for performing signal reception testing of the wireless data communication system of FIG. 1 in accordance with another embodiment of the presently claimed invention.

Referring to FIG. 6, if a packet error is encountered, the DUT 100 does not receive its full predetermined number of good packets. As shown, the test flow begins from where the previous test was a transmit test. The VSG of the test equipment 160 sends the test command 610 indicating the start of the new operation or the end of the previous operation. The DUT 100 receives this command 620 and prepares to enable itself for receive testing 680. When it is ready, the DUT 100 sends its acknowledgement that it is ready to receive 640. This acknowledgement is received 650 by the test equipment 160, following which when the test equipment 160 is ready, e.g., completing its internal setup 630, it begins transmitting the predetermined number of packets 661, 662, 663, 664, 668, 669. In response to this, the DUT 100 transmits an acknowledgement 671, 673, 674, 678, 679 for each of the good packets it has received.

As shown, one of the packets 662 was not received by the DUT 100. Accordingly, no corresponding acknowledgement was transmitted by the DUT 100 as illustrated by an empty received packet 690 in the figure. Following completion of the transmit sequence, the test equipment 160 knows how many acknowledgement packets it received, and since one packet was apparently missed 690, the test equipment 160 knows that the receiver of the DUT 100 is still awaiting at least one more packet before it can continue to the next test in the test flow. Accordingly, the test equipment 160 will compute 635 the number of additional packets needed to be received by the DUT 100, and begin transmitting 691 the necessary number of packets.

Following reception of this missing packet, the DUT 100 transmits an acknowledgement signal 692, and begins preparing for the next test operation 681. When it is ready, the DUT 100 will send another acknowledgement to the test equipment 160. In this example, the test equipment 160 is not yet ready when the DUT 100 is ready. Accordingly, the DUT 100 sends it acknowledgement signal 641, but since the test equipment 160 is not yet ready and does not respond, the DUT 100, after a predetermined time interval, will send another acknowledgement signal 642. The test equipment 160 is now ready and following reception of this acknowledgement signal 651 begins to transmit more data packets 661, to which the DUT 100 responds by sending corresponding acknowledgement packets 671.

As discussed above, the signals being transmitted for testing purposes can be multi-packet signals, in which case it may be desirable to have the DUT 100 respond only to certain types of data packets. For example, transmitting different data packets at different power levels can allow testing of actual receiver sensitivity to be performed (where certain packets are expected to not be received) without requiring the transmitter to send many more packets to make the receiver meet the desired packet number for progression to the next test.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing data signal transmissions of a wireless transceiver embedded within a wireless data communication system that also includes a host processor with minimal interaction between said wireless transceiver and said host processor during said testing, comprising:

transferring test firmware via said host processor to said wireless transceiver;

setting said wireless transceiver in a test operation mode;

transmitting, with said wireless transceiver in accordance with said transferred test firmware and substantially independently of said host processor, a respective plurality of test data packets in response to reception, by said wireless transceiver, of a corresponding one of a plurality of sequential test initiation signals from a control signal source external to said wireless data communication system, wherein each one of said respective plurality of test data packets is substantially unrelated to said corresponding one of a plurality of sequential test initiation signals; and determining, with a test system external to said wireless data communication system, validity of each one of said transmitted respective plurality of test data packets irrespective of content of said transmitted respective plurality of test data packets.

2. The method of claim 1, further comprising loading said test firmware into said host processor prior to said transferring said test firmware via said host processor to said wireless transceiver, wherein said test firmware includes a plurality of data corresponding to a test protocol.

3. The method of claim 2, wherein said test firmware further includes another plurality of data corresponding to a test sequence.

4. The method of claim 1, wherein said setting said wireless transceiver in a test operation mode comprises setting said wireless transceiver in a test operation mode responsive to said test firmware transfer.

5. The method of claim 1, wherein said setting said wireless transceiver in a test operation mode comprises setting said wireless transceiver in a test operation mode responsive to reception of a test mode control signal received from said host processor.

6. The method of claim 1, wherein said setting said wireless transceiver in a test operation mode comprises awaiting reception, by said wireless transceiver, of at least a first one of said plurality of sequential test initiation signals from said control signal source external to said wireless data communication system.

7. The method of claim 1, wherein said setting said wireless transceiver in a test operation mode comprises transmitting, with said wireless transceiver, a ready signal indicative of said wireless transceiver being in said test operation mode.

8. The method of claim 1, wherein said transmitting, with said wireless transceiver in accordance with said transferred test firmware, a respective plurality of test data packets in response to reception, by said wireless transceiver, of a corresponding one of a plurality of sequential test initiation signals from a control signal source external to said wireless data communication system comprises transmitting, with said wireless transceiver, a respective plurality of test data packets in response to reception, by said wireless transceiver, of a GOTO-NEXT command signal.

9. The method of claim 1, wherein said transmitting, with said wireless transceiver in accordance with said transferred test firmware, a respective plurality of test data packets in response to reception, by said wireless transceiver, of a corresponding one of a plurality of sequential test initiation signals from a control signal source external to said wireless data communication system comprises transmitting, with said wireless transceiver, an acknowledgement signal.

10. The method of claim 1, wherein said transmitting, with said wireless transceiver in accordance with said transferred test firmware, a respective plurality of test data packets in response to reception, by said wireless transceiver, of a corresponding one of a plurality of sequential test initiation signals from a control signal source external to said wireless data communication system comprises transmitting, with said wireless transceiver, said respective plurality of test data packets in conformance with a predetermined test sequence.

11. A method for testing data signal reception of a wireless transceiver embedded within a wireless data communication system that also includes a host processor with minimal interaction between said wireless transceiver and said host processor during said testing, comprising:
transferring test firmware via said host processor to said wireless transceiver;
setting said wireless transceiver in a test operation mode;
receiving, with said wireless transceiver, a plurality of test data packets from a data signal source external to said wireless data communication system; and
transmitting, with said wireless transceiver in accordance with said transferred test firmware, at least one acknowledgement signal in response to reception of each one of said plurality of test data packets that is recognized by said wireless transceiver as one of a plurality of predetermined data packet types.

12. The method of claim 11, further comprising loading said test firmware into said host processor prior to said transferring said test firmware via said host processor to said wireless transceiver, wherein said test firmware includes a plurality of data corresponding to a test protocol.

13. The method of claim 12, wherein said test firmware further includes another plurality of data corresponding to a test sequence.

14. The method of claim 11, further comprising receiving, with said wireless transceiver, at least one test initiation signal prior to said receiving, with said wireless transceiver, a plurality of test data packets from a data signal source external to said wireless data communication system.

15. The method of claim 11, wherein said setting said wireless transceiver in a test operation mode comprises setting said wireless transceiver in a test operation mode responsive to said test firmware transfer.

16. The method of claim 11, wherein said setting said wireless transceiver in a test operation mode comprises setting said wireless transceiver in a test operation mode responsive to reception of a test mode control signal received from said host processor.

17. The method of claim 11, wherein said setting said wireless transceiver in a test operation mode comprises awaiting reception, by said wireless transceiver, of one or more predetermined test initiation signals from a control signal source external to said wireless data communication system.

18. The method of claim 11, wherein said setting said wireless transceiver in a test operation mode comprises transmitting, with said wireless transceiver, a ready signal indicative of said wireless transceiver being in said test operation mode.

* * * * *